UNITED STATES PATENT OFFICE.

T. P. MERRIAM, OF NEW BEDFORD, MASSACHUSETTS.

IMPROVEMENT IN COMPOSITIONS FOR PRESERVING LEATHER.

Specification forming part of Letters Patent No. 2,844, dated November 4, 1842.

*To all whom it may concern:*

Be it known that I, T. P. MERRIAM, of New Bedford, in the county of Bristol and State of Massachusetts, have invented a new and Improved Composition to be Used for the Purpose of Preserving, Renovating, Waterproofing, and Blackening Leather, which composition I denominate "The Oil of Bark, or Leather-Restorative and Water-Proof Composition;" and I do hereby declare that the following is a full and exact description thereof.

I take the following ingredients in the proportions, or nearly in the proportions, herein designated. Supposing the whole composition to be divided into equal parts, by weight, I take about six parts of logwood and five of oak and hemlock bark, and these I boil in a sufficient quantity of water for two or three days, so as to make a strong decoction, which I strain off. I then take two parts of black lead or Bristol luster, two parts of copperas, and two parts of nut-galls, and boil these together, strain the mixture, and add it to the former decoction. I next boil together about two parts of neat's-foot oil, two parts of olive-oil, one part of linseed-oil, and one part of beeswax, which I add to the mixture as before, together with about one part of spirits of turpentine, one part of aqua-ammonia, and four or five parts of soap. This constitutes the whole mixture or compound, which I then boil for a considerable length of time—that is to say, until it has acquired the proper degree of consistence, of which I judge by allowing a portion of it to cool and applying it to the leather.

All that is necessary in using this composition is to rub it well into the leather, which may be conveniently effected by means of a piece of woolen cloth. When this has been done the composition will be so completely absorbed by the leather that it will not soil the hand or any article which is passed over it, and leather that has become stiff and worthless from age and exposure will be rendered perfectly soft and pliable.

Having thus fully described the manner in which I prepare and use my oil of bark or leather restorative, I do hereby declare that I do not intend to limit myself in compounding the same to the precise proportions of the respective ingredients herein named, but to vary these as I may think proper, while as a whole the article produced is substantially the same with that described. It will be manifest, also, that some of the individual ingredients may be omitted and others added without materially changing the nature of the compound. Thus, for example, the sweet-oil or the neat's-foot oil may be replaced by other oils used nearly in the same proportions. Instead of using both oak-bark and hemlock-bark, one of them may be omitted and the quantity of the other proportionately increased, and so of some other parts of the composition.

What I claim therefore as of my invention, and desire to secure by Letters Patent, is—

The preparing of a compound for the preserving and renovating of leather, which shall consist generally of the ingredients herein designated, with only such variations thereof as will leave it, as a whole, substantially the same with that herein fully made known.

T. P. MERRIAM.

Witnesses:
   W. G. ROBINSON,
   JAMES NYE.